United States Patent
Niles

(10) Patent No.: US 9,690,781 B1
(45) Date of Patent: Jun. 27, 2017

(54) SYSTEM FOR AUTOMATICALLY CHANGING LANGUAGE OF AN INTERACTIVE INFORMATIONAL DISPLAY FOR A USER BY REFERENCING A PERSONAL ELECTRONIC DEVICE OF THE USER

(71) Applicant: James E. Niles, New York, NY (US)

(72) Inventor: James E. Niles, New York, NY (US)

( * ) Notice: Subject to any disclaimer, the term of this patent is extended or adjusted under 35 U.S.C. 154(b) by 279 days.

(21) Appl. No.: 14/674,798

(22) Filed: Mar. 31, 2015

Related U.S. Application Data

(63) Continuation-in-part of application No. 14/516,750, filed on Oct. 17, 2014, now Pat. No. 9,552,830.

(60) Provisional application No. 62/086,007, filed on Dec. 1, 2014.

(51) Int. Cl.
*G06F 17/27* (2006.01)
*G06F 17/28* (2006.01)
*G06Q 20/10* (2012.01)

(52) U.S. Cl.
CPC .......... *G06F 17/289* (2013.01); *G06F 17/275* (2013.01); *G06Q 20/1085* (2013.01)

(58) Field of Classification Search
CPC .................................................. G06F 17/289
USPC ...................................................... 704/8, 9
See application file for complete search history.

(56) References Cited

U.S. PATENT DOCUMENTS

| | | | |
|---|---|---|---|
| 7,480,546 B2 | 1/2009 | Kamdar et al. | |
| 8,386,231 B2 | 2/2013 | LeBeau et al. | |
| 8,494,838 B2 | 7/2013 | Donabedian et al. | |
| 8,761,513 B1 | 6/2014 | Rogowski et al. | |
| 8,897,423 B2 | 11/2014 | Nanjundaswamy | |
| 2003/0149576 A1 | 8/2003 | Sunyich | |
| 2003/0202683 A1 | 10/2003 | Ma et al. | |
| 2004/0103043 A1* | 5/2004 | Reade | G06Q 20/208 705/23 |
| 2004/0210444 A1 | 10/2004 | Arenburg et al. | |
| 2005/0051620 A1 | 3/2005 | DiLuoffo et al. | |
| 2005/0150944 A1* | 7/2005 | Melick | G06K 7/10544 235/375 |
| 2006/0023945 A1* | 2/2006 | King | H04N 1/00244 382/173 |
| 2006/0167677 A1* | 7/2006 | Bitzer | G06F 9/4448 704/9 |
| 2009/0285445 A1 | 11/2009 | Vasa | |

(Continued)

FOREIGN PATENT DOCUMENTS

| EP | 0 499 211 A2 | 8/1992 |
|---|---|---|
| EP | 1359557 | 2/2003 |

(Continued)

*Primary Examiner* — Shaun Roberts

(57) ABSTRACT

A language setting system, for use by a user having a native language and carrying a personal electronic device, when using an informational device having an active language setting. As the user approaches the informational device, the informational device determines that the personal electronic device is associated with the user. The system determines the native language of the user by contacting the personal electronic device and sets the active language informational device to the native language. The informational device provides messages and information to the user in the native language of the user. When the user retreats from the informational device, the active language of the informational device may be reset to a default language.

13 Claims, 8 Drawing Sheets

(56) References Cited

U.S. PATENT DOCUMENTS

| | | | |
|---|---|---|---|
| 2010/0036600 A1* | 2/2010 | Shinmyoh | G01C 21/3688 |
| | | | 701/532 |
| 2010/0174599 A1* | 7/2010 | Rosenblatt | G06Q 30/02 |
| | | | 705/14.37 |
| 2010/0312385 A1* | 12/2010 | Deuber | G06Q 10/087 |
| | | | 700/245 |
| 2012/0028680 A1 | 2/2012 | Breed | |
| 2012/0035908 A1 | 2/2012 | Lebeau et al. | |
| 2012/0123924 A1* | 5/2012 | Rose | G06Q 20/12 |
| | | | 705/35 |
| 2012/0197798 A1* | 8/2012 | Grigg | G06Q 20/1085 |
| | | | 705/43 |
| 2013/0218721 A1* | 8/2013 | Borhan | G06Q 20/322 |
| | | | 705/26.41 |
| 2013/0282360 A1 | 10/2013 | Shimota et al. | |
| 2013/0346061 A1 | 12/2013 | Donabedian et al. | |
| 2014/0279490 A1* | 9/2014 | Calman | G06Q 20/40 |
| | | | 705/43 |

FOREIGN PATENT DOCUMENTS

| | | |
|---|---|---|
| EP | 2 597 838 A1 | 5/2013 |
| EP | 2587389 | 5/2013 |
| WO | WO2009139783 | 11/2009 |
| WO | WO2012018802 | 2/2012 |
| WO | WO2013071004 | 5/2013 |
| WO | WO2014001937 | 1/2014 |
| WO | WO 2014/107793 A1 | 7/2014 |

* cited by examiner

SYSTEM FOR AUTOMATICALLY CHANGING LANGUAGE OF AN INTERACTIVE INFORMATIONAL DISPLAY FOR A USER BY REFERENCING A PERSONAL ELECTRONIC DEVICE OF THE USER

CROSS REFERENCES AND RELATED SUBJECT MATTER

This application is a continuation-in-part of utility patent application Ser. No. 14/516,750, filed in the United States Patent Office on Oct. 17, 2014; and also is a non-provisional filing of subject matter contained in provisional patent application Ser. No. 62/086,007, filed in the United States Patent Office on Dec. 1, 2014.

TECHNICAL FIELD

The present disclosure relates generally to communication and interaction with users who may not speak or understand the language in the location they are visiting. More particularly, the present disclosing relates to a system and method for interactive informational devices that change language to the native language of a visitor/user automatically by referencing the default language of the user's smart phone or other personal electronic device.

BACKGROUND

Increasingly people obtain information electronically. Previously ubiquitous items such as paper maps, travel guide books and paper menus, as well as ticket agents and bank tellers, have now all but disappeared in favor of GPS powered applications, electronic informational kiosks, digital menus, and ATMs that dispense currency and mass transit tickets.

While such devices clearly represent advancement in technology, in practice they are only useful if they are understandable by the user. While the ability to use such technological devices to obtain information has become nearly universal and cross cultural, potential consumers of such informational devices are still divided by their native languages. Accordingly, for any informational device to be useful, it must be capable of interacting with users in more than one language. And in some contexts and some locales, the devices must be capable of many different languages.

Manually setting the language of any informational device can be tricky, confusing, and time consuming as the user might be required to navigate the never-ending menu selection, which in itself is in a different language to begin with. Considering that millions of people travel internationally each year to countries where languages other than their own are spoken, displayed, or written, it is a frequent occurrence that travelers are unable to understand the information that is provided, and are thereby unable to act appropriately. Accordingly, the mismatch between travelers and the information could be a big safety concern, as travelers may not understand evacuation routes or other warning messages, which are provided for their safety.

While the informational devices currently available have attempted to provide travelers a complete user experience, they have fallen short because of the foreign language barrier. Thus, while these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a process and method for setting an active language of an informational device to the native language of a user. Accordingly navigation, information, and messages from the informational device are provided to the user in their native language thereby providing a complete, seamless, and integrated user experience.

It is another aspect of an example embodiment in the present disclosure to provide a system where the language is set automatically. Accordingly, the active language of the informational device may be set by reference to the smart phone or other personal electronic device carried by the traveler/user to determine a language preference of the user. Transceiver sensors connected to the informational device may initiate the communication between the user smart phone/portable electronic device and the informational device. Connectivity may require that a user place their personal electronic device near and/or on the informational device or its transceiver sensor, or may require that the devices tap each other briefly. If the informational device detects multiple languages during connectivity, then the user may be prompted to select a preferred language to complete setting the active language on the informational device.

It is yet another aspect of an example embodiment to determine the preferred language of the user when the default language of the personal electronic device cannot be determined. Accordingly, scanning email or text message on user's personal electronic device to detect examples of native language usage may also be used in determining the preferred language. Additionally, the user's native language may be stored as a preference with the operating system of the personal electronic device or within an app on the personal electronic device.

The present disclosure describes a language setting system, for use by a user having a native language and carrying a personal electronic device, when using an informational device having an active language setting. As the user approaches the informational device, the informational device determines that the personal electronic device is associated with the user. The system determines the native language of the user by contacting the personal electronic device, and sets the active language of the informational device to the native language. The informational device provides messages and information to the user in the native language of the user. When the user retreats from the informational device, the active language of the informational device may be reset to a default language.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form described in the accompanying text. Attention is called to the fact, however, such description is illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

What follows are descriptions of various scenarios and embodiments that follow the principles of the present disclosure. As appropriate throughout these examples, a smartphone or portable electronic device carried by the user is used to determine the language preference/native language of the user, which is then used to set the active language of other smart devices. Note that in the following discussion, "menu" may sometimes refer to a listing of commands or options that are displayed to a user, and may sometimes refer to a list of items available at a restaurant. Similarly, "navigation" may sometimes refer to the scheme for the user to operate the functionality of a device, and may sometimes refer to instructions and steps taken to move between physical locations. Although similar terminology might be used with differing intent, the context of the use can be used to clarify such intent.

Figure 1:
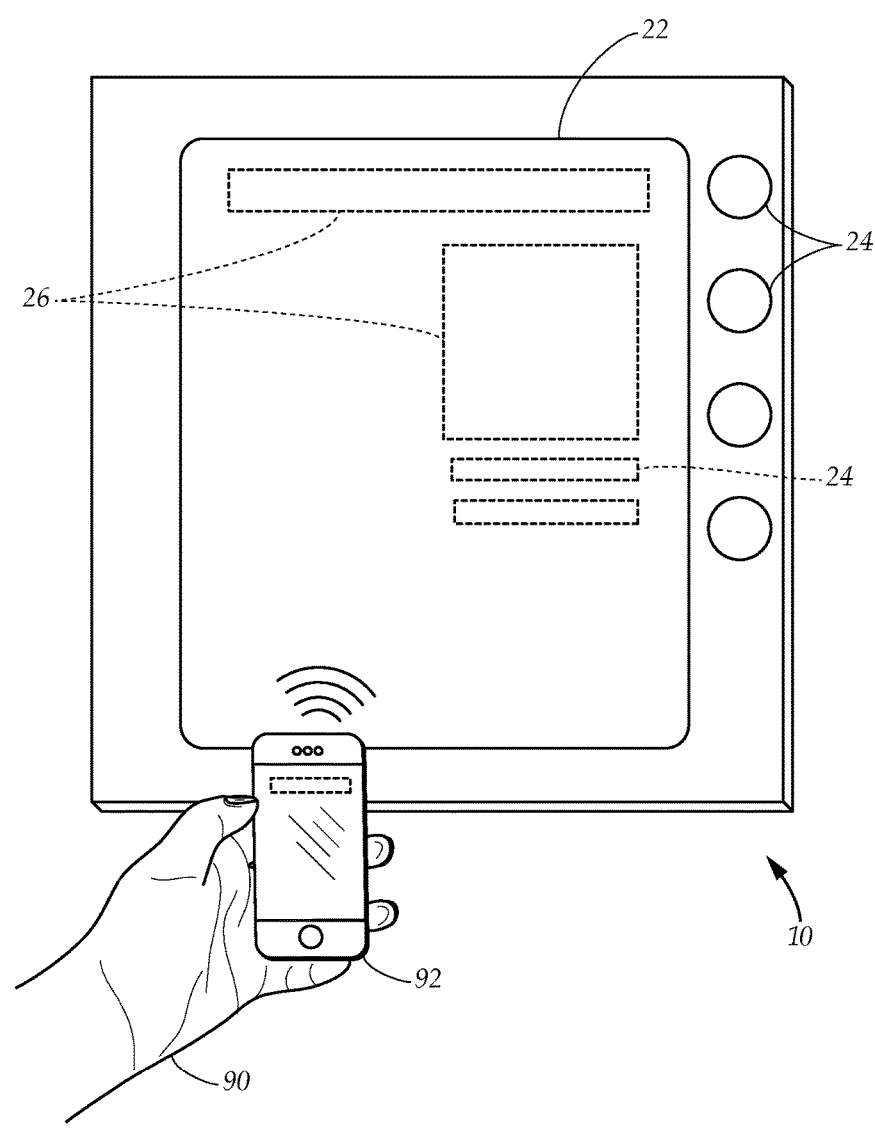
FIG. 1 illustrates an example embodiment of an interactive informational device, namely an informational kiosk, wherein a personal electronic device of a user is used to set the active language of the informational device.

FIG. 1 illustrates an embodiment of an interactive informational device 10. Namely, FIG. 1 illustrates user 90 approaching the informational device 10. The informational device 10 includes a display 22 and buttons 24. The display provides a plurality of messages 26 to the user 90, and may invite interaction through the buttons 24 and other input devices. Note that the display may be a touchscreen, with some or all of its buttons 24 created virtually thereupon. The interactive informational device 10 has a default language, and is also capable of providing messages and content in several languages, as well as providing menus, navigation, and receiving commands in several languages. Accordingly, the informational device 10 has an active language setting for determining which language to provide such programming, menus, navigation, messages, and information. The default language is likely a language commonly spoken in the locale of the informational device 10, and thus the active language is initially set to the default language. In accordance with the principles of the present disclosure, the user 90 has a native language, and has a personal electronic device 92, which in this example is a smartphone. The personal electronic device 92 may be a smartphone, tablet, or other device habitually carried and used by the user. The personal electronic device preferably has a user selected language setting, which may be part of the operating system, be set in an application, or be otherwise determinable from the personal electronic device. In addition, the personal electronic device has other applications, such as text messaging and emailing, which allow the user to communicate with other personal electronic devices, and which contain examples of previous communications with the user occurring in the native language of the user. Further, in accordance with the principles of the present disclosure, the personal electronic device 92 is used to set the active language setting of the informational device 10 so that the informational device provides messages and other information to the user 90 in the native language of the user 90, as well as providing buttons 24 and other navigational information to the user in the native language.

Figure 6:
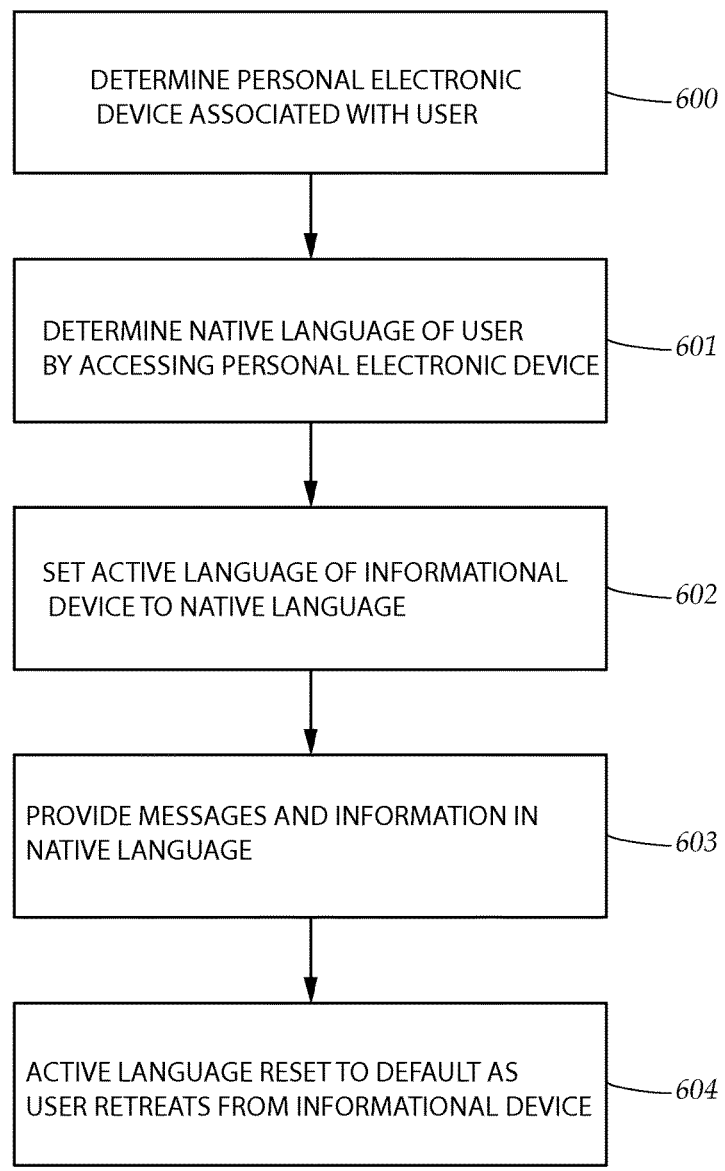
FIG. 6 is a flow chart, illustrating an aspect of the language setting system according to the principles of the present disclosure, wherein the active language of the informational device is set to the native language of the user.

Referring to FIG. 6, as the user approaches the informational device, the personal electronic device is determined by the informational device to be associated with the user 600. Any suitable communication protocol may be used to contact, communicate with and/or interrogate the personal electronic device, including but not limited to BLUETOOTH, WiFi, BEACON, RFID or other near-field communication scheme, optical/infrared, and any other communication protocol currently or prospectively available that allows the described functionality to be carried out. Such communication might require pairing or other authorization to allow access to the personal electronic device by the informational device, and may require a dedicated transceiver sensor at the informational device for creating a communication connection with the informational device. Once a suitable connection is made, the native language of the user is determined by accessing the personal electronic device 601, which may include reading or otherwise receiving the language setting of the personal electronic device, or using an algorithm to assess the likely native language by reviewing communications on the personal electronic device. Then, the active language setting of the informational device 10 is set to be the same as the language setting of the personal electronic device 602. Accordingly, messages and information are provided by the informational system in the native language 603. The active language is reset to the default language as the user retreats from the informational device 604.

Note that the step of determining that the personal electronic device is associated with the user 600 may include an assessment based on proximity of the personal electronic device to the informational system (FIG. 1). Such may be comparative, wherein the nearest personal electronic device to the informational system 10 is deemed to belong to the user or it may be absolute, where the personal electronic device is deemed to belong to the traveler when situated within a specific location or range of locations. It may also be assessed upon tapping the personal electronic device against the informational device, or at some other predetermined location adjacent thereto.

The informational device 10 shown in FIG. 1 may be provided as an information kiosk, thereby located at a fixed location and intended to provide information to visitors and travelers to a locale, to facilitate an informed experience and maximize use of local facilities and opportunities. Accordingly, the information kiosk may displays messages 26 that provide information about local sites, businesses, points of interest, local events, safety/emergency information, as well as information for traveling between locations.

By establishing a language for the informational device, a user can have the unique user experience and still understand information that is presented in their native language. With correct native language established, the informational device will automatically change the menu selection into the user's native language. Instructional videos, tour guide videos, or other content may be provided in the native language or have appropriate closed captioning. Safety/emergency information may be displayed on the informational device or pushed to user's personal electronic device in their native language. Depending on its location and intended purpose, the informational device may display (audio or visual) information such as local information and tips, news media, weather, and navigation maps in user's native language or may be pushed to user's personal electronic device in their native language. In addition, various purchasing choices may be displayed on the informational device or pushed to user's personal electronic device in their native language and may allow for purchase transactions to be conducted in the user's native language. When the user walks away from the informational device, the informational device may default back to an initial default language so that it is available for the next user.

Figure 2:
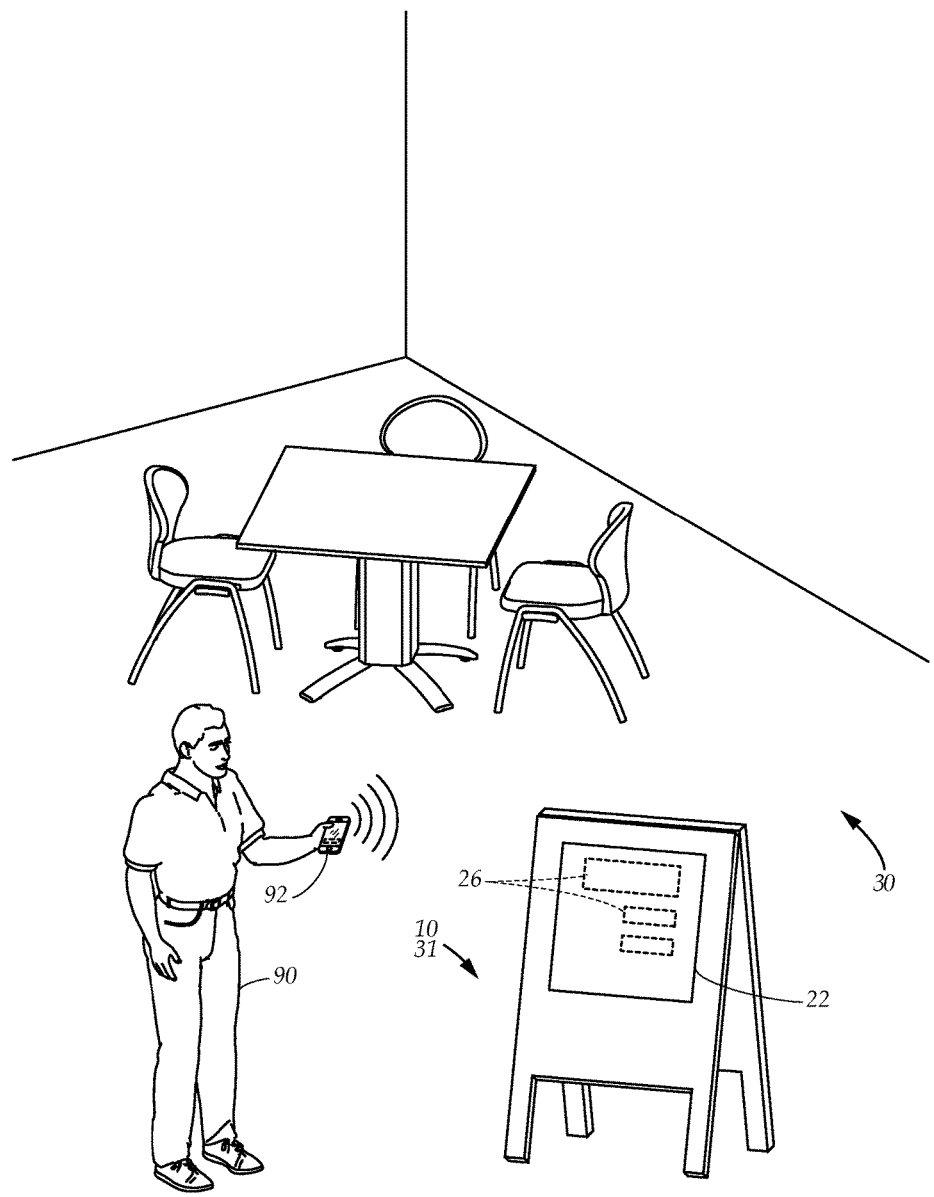
FIG. 2 illustrates an example embodiment of an informational device, namely a menu board at a cafeteria/restaurant, wherein the personal electronic device of a user is used to set the active language of the menu device.

Referring to FIG. 2, another embodiment is illustrated wherein the informational device 10 is a menu board 31 at a restaurant 30. The menu board 31 has a display 22, upon which messages 26 are displayed. The messages 26 may include available items, and options to display other items or information to the user. The display may be a touch screen wherein some of such messages 26 may be configured as buttons 24. The menu board 31 can provide its messages in several available languages, and has an active language setting for determining which of the available languages to use for displaying said messages. In accordance with the principles of the present disclosure, the personal electronic device 92 of the user 90 is used to set the active language setting of the menu board 31 so that the menu board 31 provides messages, including available items and other information to the user 90 in the native language of the user 90.

Figure 3:
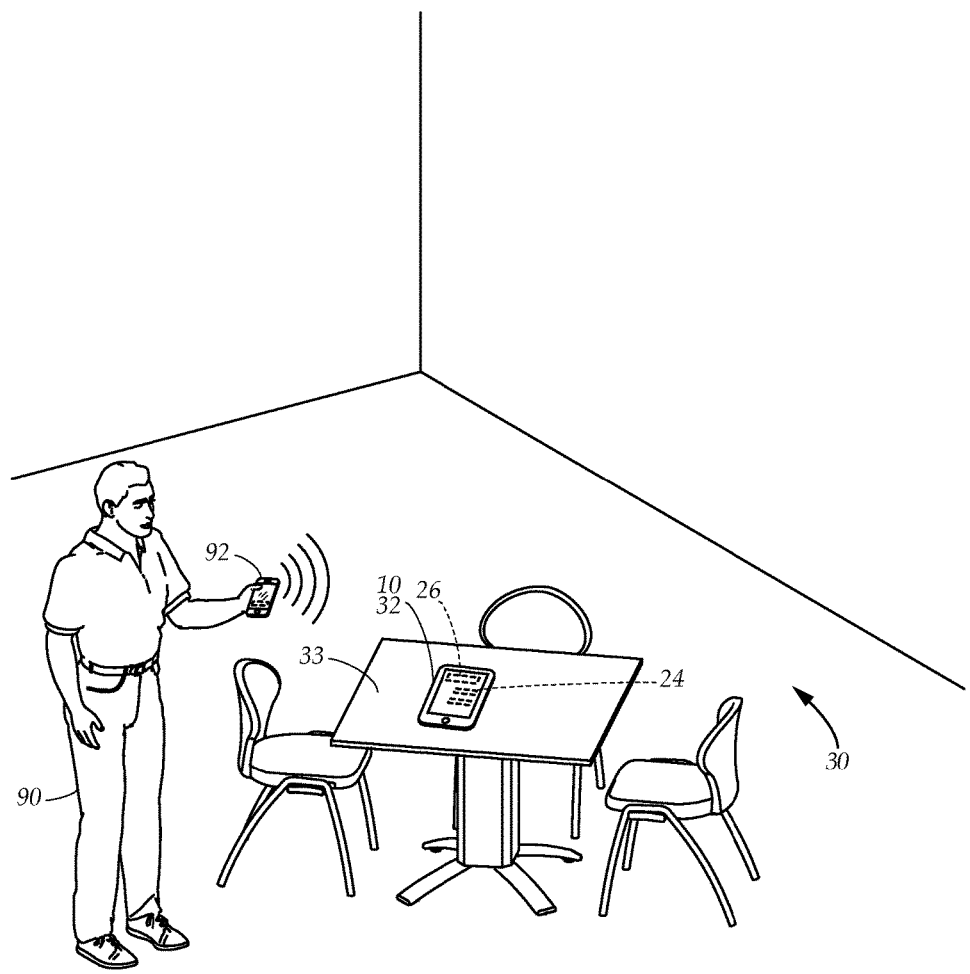
FIG. 3 illustrates another example embodiment of an informational device, namely, a portable electronic menu, wherein the personal electronic device of a user is used to set the active language of the menu device.
Figure 7:
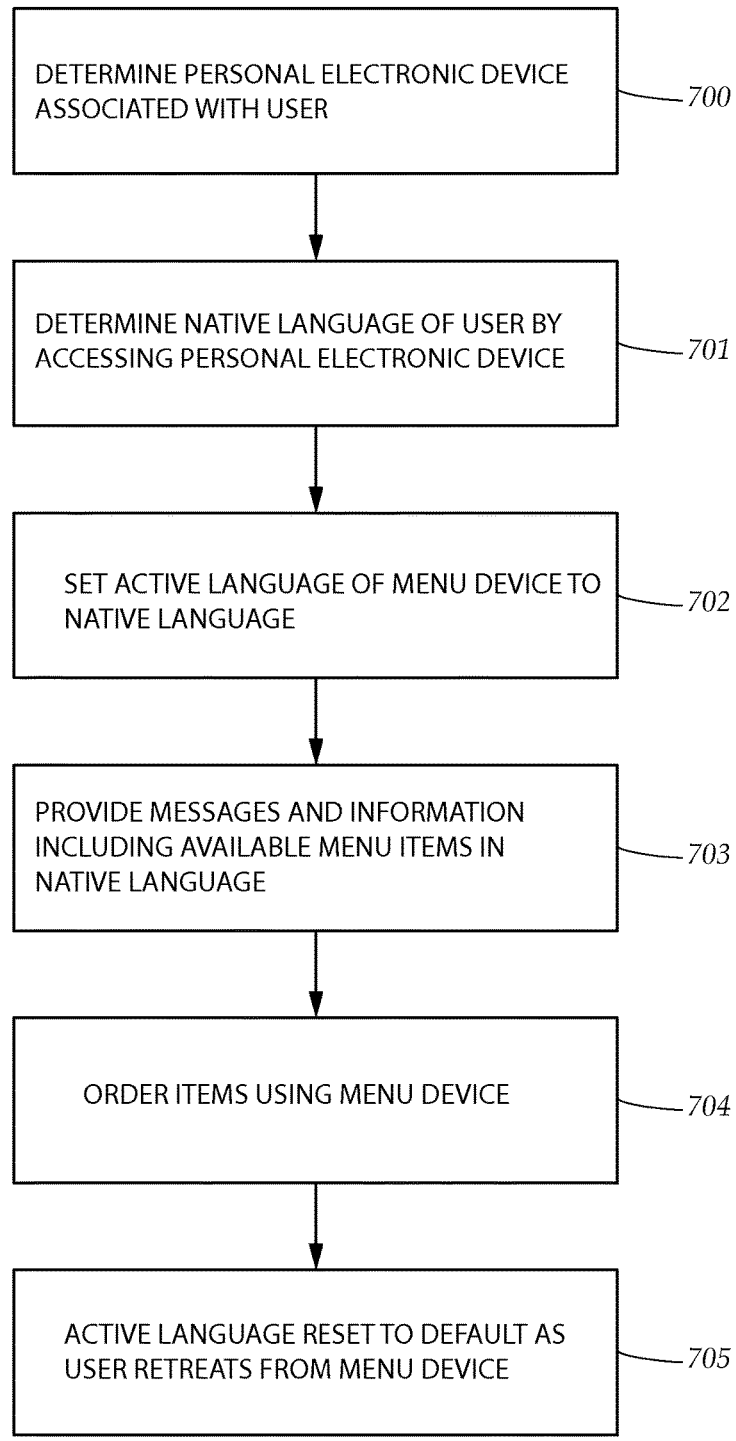
FIG. 7 is a flow chart, illustrating an aspect of the language setting system according to the principles of the present disclosure, wherein the active language of the menu device is set to the native language of the user.

Referring to FIG. 3, another embodiment is illustrated wherein the informational device 10 is a menu device, namely a personal electronic menu 32. The personal electronic menu 32 may be provided upon a tabletop 33 at the restaurant 30 to facilitate informing the user 90 of available items at the restaurant 30 and to facilitate the user 90 ordering items from the available items. Accordingly, the messages 26 may display available items, which may then function as buttons 24 for ordering one or more of said available items. In accordance with the principles of the present disclosure, the personal electronic device 92 of the user 90 is used to set the active language setting of the personal electronic menu 32 so that the personal electronic menu 32 provides messages, including available items and other information to the user 90 in the native language of the user 90. Referring to FIG. 7, initially as the user approaches the menu device the personal electronic device is determined by the menu device to be associated with the user 700. Then, the native language of the user is determined by accessing the personal electronic device 701, which may include reading or otherwise receiving the language setting of the personal electronic device, or using an algorithm to assess the likely native language by reviewing communications on the personal electronic device. Then, the active language setting of the menu device is set to be the same as the language setting of the personal electronic device 702. Accordingly, messages and information, including available items (on the restaurant menu) are provided by the menu system in the native language 703. The user may order items using the menu device 704. The active language is reset to the default language as the user retreats from the menu device 705.

Figure 4:
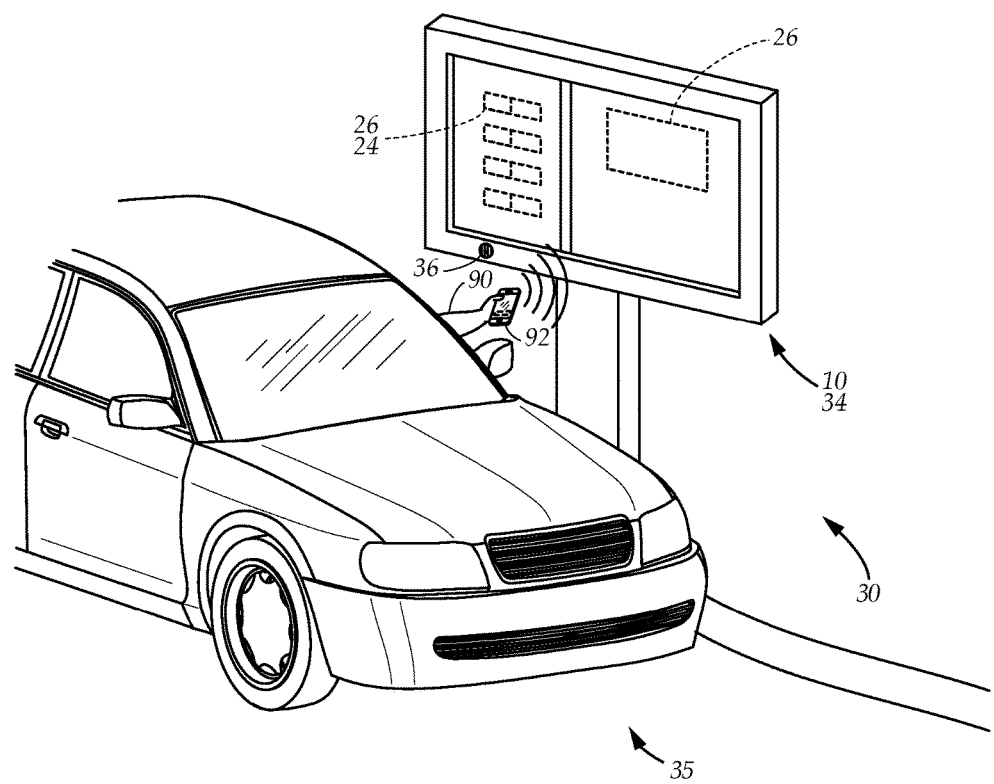
FIG. 4 illustrates another example embodiment of an informational device, namely, an outdoor menu at a restaurant drive-thru lane, wherein the personal electronic device of a user is used to set the active language of the menu device.

Referring to FIG. 4, another embodiment of the menu device is illustrated wherein the informational device 10 is an outdoor menu board 34. The outdoor menu board 34 may be provided adjacent to a drive-thru lane 35 at the restaurant 30 to facilitate informing the user 90 of available items at the restaurant 30 and to facilitate the user 90 ordering items from the available items. Accordingly, the messages 26 may display available items, which may then function as buttons 24 for ordering one or more of said available items. In addition, ordering may be provided by communicating with a restaurant agent through a two-way audio device 36. In accordance with the principles of the present disclosure, the personal electronic device 92 of the user 90 is used to set the active language setting of the menu board 34 so that the personal electronic menu 32 provides messages, including available items and other information to the user 90 in the native language of the user 90.

Figure 5:
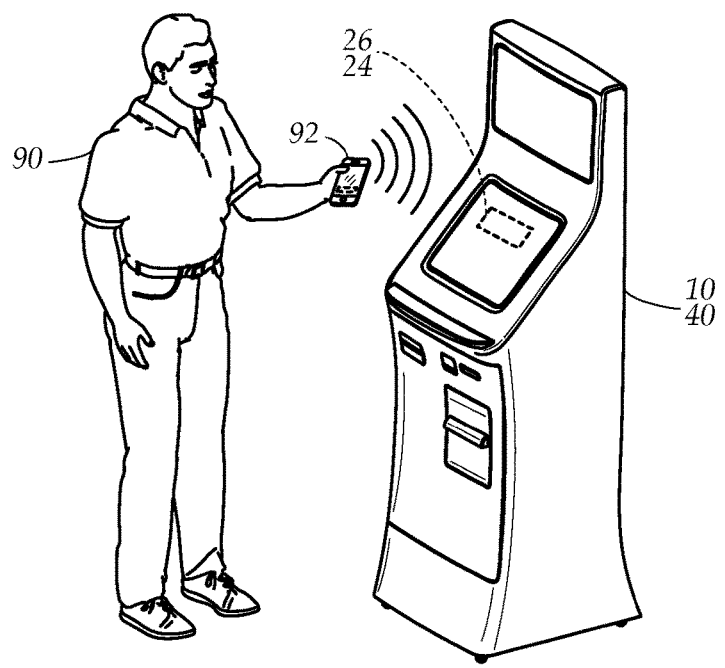
FIG. 5 illustrates another example embodiment of an informational device, namely an automated teller device, wherein the personal electronic device of a user is used to set the active language of the automated teller device.
Figure 8:
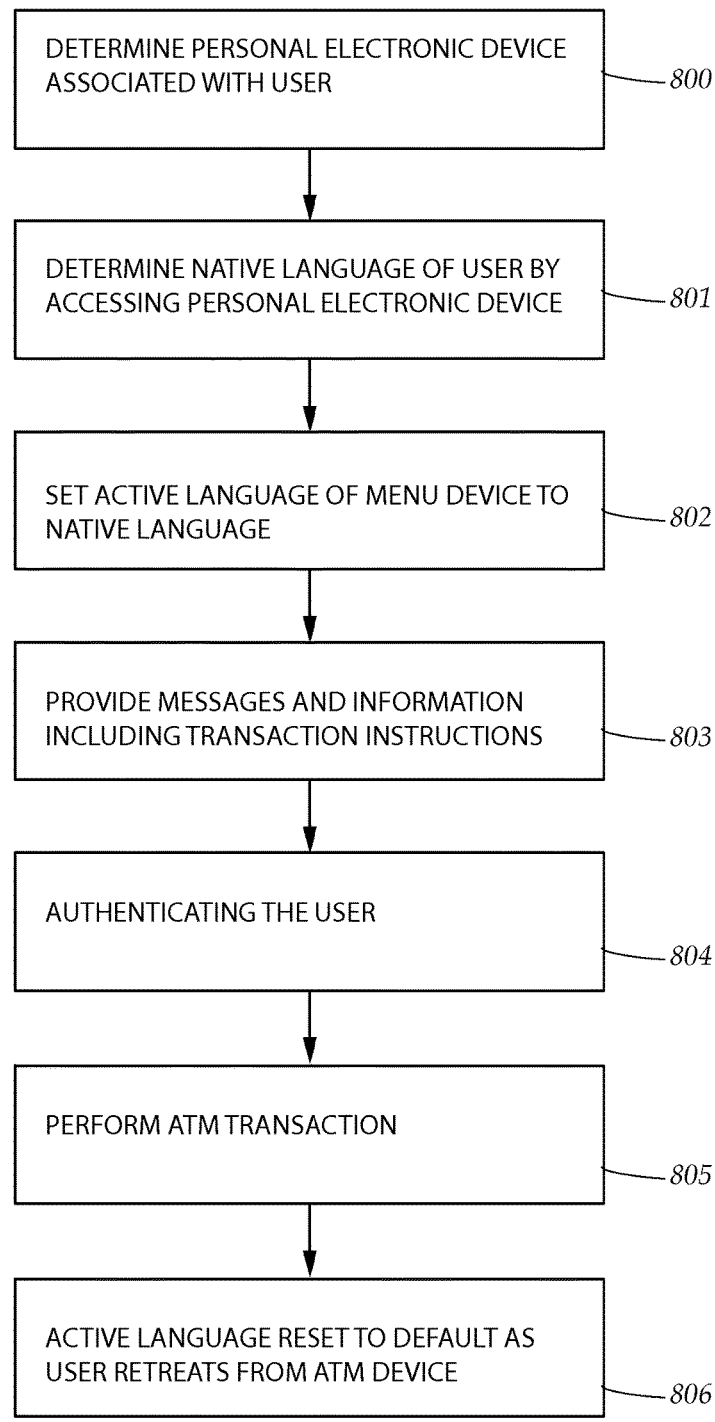
FIG. 8 is a flow chart, illustrating an aspect of the language setting system according to the principles of the present disclosure, wherein the active language of the automated teller device is set to the native language of the user.

FIG. 5 displays another embodiment of the informational device 10, wherein the informational device 10 is an automated teller device or ATM (Automated Teller Machine) 40. The ATM provides the essential functionality of allowing the user 90 to access funds in an account associated with the user 90, and to provide currency, tickets, or other items to the user, deducted from the funds in said account associated with the user 90. The ATM 40 displays messages 26 and provides buttons 24 which facilitate this functionality. Whether providing currency, or tickets to travelers seeking to use a mass transit system, the ATM 40 is likely provided in a location convenient for travelers, who may not speak or understand the local language. In accordance with the principles of the present disclosure, the personal electronic device 92 of the user 90 is used to set the active language setting of the ATM 40 so that it provides messages and information that facilitate completing a transaction, using the native language of the user 90. Referring to FIG. 8, initially the personal electronic device is determined by the automated teller device to be associated with the user 800. Then, the native language of the user is determined by accessing the personal electronic device 801, which may include reading or otherwise receiving the language setting of the personal electronic device, or using an algorithm to assess the likely native language by reviewing communications on the personal electronic device. Then, the active language setting of the menu device is set to be the same as the language setting of the personal electronic device 802. Accordingly, messages and information, including instructions for conducting an ATM transaction are provided by the automated teller device in the native language 803. Following authentication of the user 804, the user may perform an ATM transaction 805 including the automated teller device providing currency, tickets, or other items to the user from funds in the account of the user. The active language is reset to the default language as the user retreats from the automated teller device 805.

Although the above-preferred examples have been described with specificity toward user's experiences, persons skilled in this art will recognized that many changes to the specific examples disclosed above could be made without departing from the spirit of the invention.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a system for automatically changing the active language of an informational device by referencing a personal electronic device carried by the user. The disclosure is illustrated by example throughout the written description. It should be understood that numerous variations are possible, while adhering to the inventive concept. Such variations are contemplated as being a part of the present disclosure.

What is claimed is:

1. An automatic language setting system, for automatically customizing one or more informational device, said informational device having an active language setting and said informational device located within a private or semi-private or semi-public or public space, wherein said space is located within an indoor space environment or outdoor space environment, for use when encountered by a user having a native preferred language, the user carrying a personal electronic device, comprising:
   associating, at least one personal electronic device of the user with the informational device when the user approaches the informational device within said space;
   detecting, by a communication sensor at least one personal electronic device and at least one informational device within said space;
   determining, at least the preferred language of said user by contacting the personal electronic device by the informational device;
   receiving, at least a user preferred language from said personal electronic device within said space;
   setting, at least the active language of the informational device to the preferred language of the user;
   displaying and/or outputting, messages and/or information to the user in the active preferred language of said user; and
   absent of the dependency of the personal electronic device transmitting translated information to said informational device within said space or absent of the dependency of a camera equipped personal electronic device to capture an unfamiliar sign.

2. The automatic language setting system as recited in claim 1, wherein the personal electronic device has a language setting, and wherein the step of determining the native language of said user by contacting the personal electronic device further comprises determining the language setting of the personal electronic device.

3. The automatic language setting system as recited in claim 1, wherein the steps as recited are followed by the step of returning the active language setting to a default language when the user retreats from the informational device.

4. The automatic language setting system as recited in claim 1, wherein the informational device is an automatic teller device.

5. The automatic language setting system as recited in claim 1, wherein the informational device is a digital menu device, wherein the step of providing messages and/or information to the user in the active language further comprises displaying available items to the user in the preferred language; and ordering from the available items by the user.

6. An automatic language setting system, for automatically customizing one or more automated teller device, said automatic teller device having an active language setting and said automatic teller device located within a private or semi-private or semi-public or public space, wherein said space is located within an indoor space environment or outdoor space environment, for use with an automated teller device when encountered by a user having a native preferred language, the user carrying a personal electronic device comprising:
- associating at least one personal electronic device of the user with the automated teller device when the user approaches the automated teller device within said space;
- determining, at least a user preferred language of said user by contacting the personal electronic device by the automated teller device;
- receiving, at least a user preferred language from said personal electronic device within said space;
- setting, at least the active language of the automated teller device to the native preferred language of the user;
- displaying and/or outputting, messages and/or information to the user in the active preferred language of said user; and
- absent of the dependency of the personal electronic device transmitting translated information to said informational device within said space or absent of the dependency of a camera equipped personal electronic device to capture an unfamiliar sign.

7. The automatic language setting system as recited in claim 6, wherein the automated teller device further comprises of authenticating the user.

8. The automatic language setting system as recited in claim 7 wherein the personal electronic device has a language setting, and wherein the step of determining the native preferred language of said user by contacting the personal electronic device further comprises determining the language setting of the personal electronic device.

9. The automatic language setting system as recited in claim 6, wherein the steps as recited are followed by the step of returning the active language setting to a default language when the user retreats from the automated teller device.

10. An automatic language setting system, for automatically customizing one or more digital menu device, said digital menu device having an active language setting and said digital menu device located within a private or semi-private or semi-public or public space, wherein said space is located within an indoor space environment or outdoor space environment, for use by a user having a native preferred language, the user carrying a personal electronic device, comprising of:
- associating, at least one personal electronic device of the user with the menu device when the user approaches the menu device within said space;
- detecting, by a communication sensor at least one personal electronic device and at least one menu device within said space;
- determining, at least the preferred language of said user by contacting the personal electronic device by the menu device;
- receiving, at least a user preferred language from said personal electronic device within said space;
- setting, at least the active language of the menu device to the preferred language of the user;
- displaying and/or outputting, messages and/or information to the user in the active preferred language; and
- absent of the dependency of the personal electronic device transmitting translated information to said informational device within said space or absent of the dependency of a camera equipped personal electronic device to capture an unfamiliar sign.

11. The automatic language setting system as recited in claim 10, wherein the step of providing messages and information including available items to the user in the preferred language further comprises ordering from the available items by the user.

12. The automatic language setting system as recited in claim 11, wherein the personal electronic device has a language setting, and wherein the step of determining the native preferred language of said user by contacting the personal electronic device.

13. The automatic language setting system as recited in claim 10, wherein the steps as recited are followed by the step of returning the active language setting to a default language when the user retreats from the menu device.

* * * * *